United States Patent [19]

Rainer

[11] Patent Number: 4,679,165
[45] Date of Patent: Jul. 7, 1987

[54] MULTIPLICATION UNIT AND METHOD FOR THE OPERATION THEREOF

[75] Inventor: Alois Rainer, Munich, Fed. Rep. of Germany

[73] Assignee: Siemens Aktiengesellschaft, Berling and Munich, Fed. Rep. of Germany

[21] Appl. No.: 628,585

[22] Filed: Jul. 6, 1984

[30] Foreign Application Priority Data

Sep. 29, 1983 [DE] Fed. Rep. of Germany ....... 3335424

[51] Int. Cl.$^4$ .............................................. G06F 7/54
[52] U.S. Cl. .................................................. 364/760
[58] Field of Search .......................... 364/754, 757-760

[56] References Cited

U.S. PATENT DOCUMENTS

| | | | |
|---|---|---|---|
| 4,122,527 | 10/1978 | Swiatowiec | 364/760 |
| 4,130,879 | 12/1978 | Cushing | 364/760 |
| 4,238,833 | 12/1980 | Ghest et al. | 364/760 |
| 4,546,446 | 10/1985 | Machida | 364/757 |
| 4,589,086 | 5/1986 | Beifuss et al. | 364/760 |

OTHER PUBLICATIONS

Digitale "Rechenanlagen", Speiser, pp. 184-187, 1965.
"Introduction to VLSI Systems", Mead et al., pp. 157-162, 1980.

Primary Examiner—Archie E. Williams, Jr.
Assistant Examiner—Dale M. Shaw
Attorney, Agent, or Firm—Hill, Van Santen, Steadman & Simpson

[57] ABSTRACT

A multiplication unit for n-place binary numbers has a first register containing the multiplicand, and accumulator, and an arithmetic unit having operand inputs connected to the first register and to the accumulator. The operation to be undertaken by the arithmetic unit is to find by the bits of a multiplier which is contained in a second register, the second register being connected to an operation instruction input of the arithmetic unit. A multiplexer having inputs connected to the outputs of the second register through-connects the bits of five adjacent multiplier places to the inputs of a logic circuit, which derives the operation instruction for the arithmetic unit. The logic circuit also supplies an instruction to a mulitple shift unit interconnected between the output of the arithmetic unit and the input of the accumulator.

7 Claims, 1 Drawing Figure

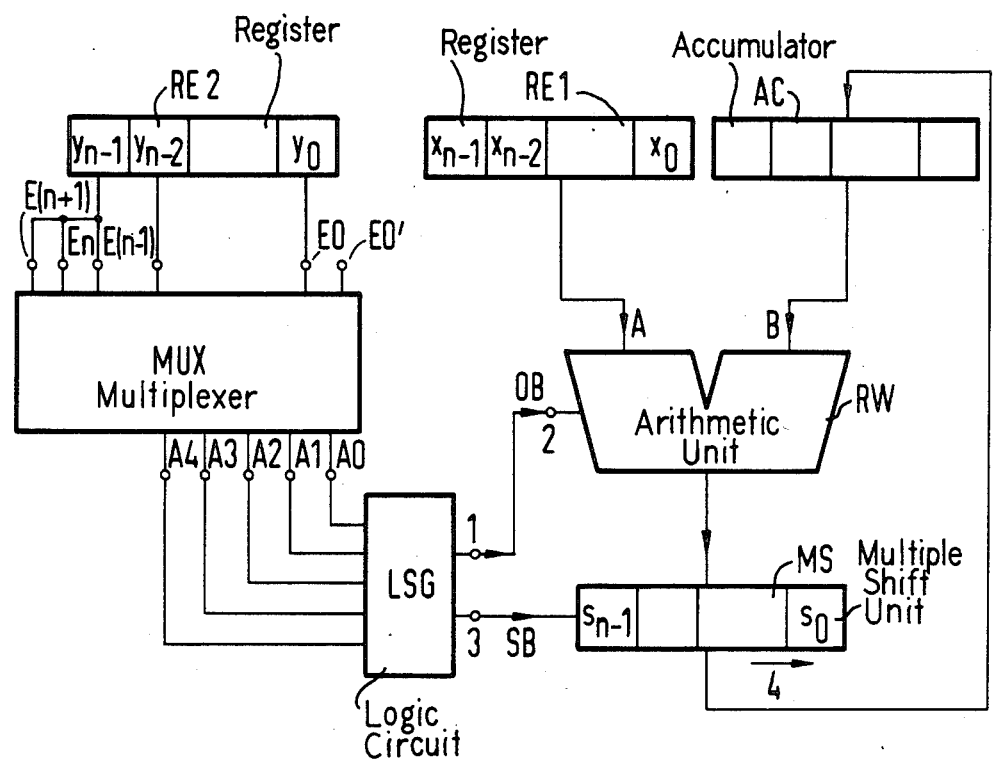

MULTIPLICATION UNIT AND METHOD FOR THE OPERATION THEREOF

BACKGROUND OF THE INVENTION

The present invention relates to multiplication units and methods for operating same, and in particular to such units and methods for multiplying n-place binary numbers such as in a signal processor.

It is an object of the present invention to provide a multiplication unit having a high working speed which requires only one n-place arithmetic unit and one n-place accumulator for multiplying n-place binary numbers represented in two's compliment.

The above object is inventively achieved in a multiplication unit having a rist register containing the multiplicand, and accumulator which accepts intermediate sums, an arithmetic unit for undertaking step-by-step logical combination of the multiplicatand with the intermediate sum contained in the accumulator, with the operand inputs of the arithmetic unit being connected to the first register and to the accumulator. The operations undertaken by the arithmetic unit are defined by the bits of a multiplier which is contained in a second register, the outputs of which are connected to an operation instruction input of the arithmetic unit through a multiplexer and a logic circuit. The multiplexer through-connects the bits of five adjacent multiplier places from the second shift register to the inputs of the logic circuit. One output of the logic circuit is connected to the operation instruction input of the arithmetic unit, and a second output of the logic unit is connected to a control input of a means for shifting the logic operation results, this means in one embodiment being a multiple shift unit connected between the output of the arithmetic unit and the input of the accumulator.

The above multiplication unit and the method for operating same disclosed and claimed herein achieve a particularly high working speed by using only one n-place multiple shift unit for shifting the logical operation results which are supplied as an output by the arithmetic unit to the accumulator.

DESCRIPTION OF THE DRAWING

The single drawing is a schematic block diagram of a multiplication unit constructed in accordance with the principles of the present invention and operating according to the method disclosed herein.

DESCRIPTION OF THE PREFERRED EMBODIMENTS

The multiplication unit shown in the drawing has an n-place register RE1 which contains the multiplicands represented in two's compliment in the form of an n-place binary numer X comprised of bits $x_{n-1}, x_{n-2} \ldots x_0$. The bit $x_{n-1}$ is the highest order bit, and indicates a negative operational sign by means of a value "1" and indicates a positive operational sign of the binary number by means of a value "0". The bit $x_0$ is the lowest order or least significant bit. The output of the register RE1 is connected to a first operand input A of an arithmetic unit RW, which has a second operand input B connected to the output of an n-place accumulator AC. The output of the arthmetic unit RW is connected to the input of a multiple shift unit MS, which has an output connected to the input of the accumulator AC.

A second register RE2 contains the multiplier Y, which is also represented in the form of a binary number in two's compliment. The highest order bit $y_{n-1}$ identifies the operational sign, and the bit $y_0$ is the least significant bit.

A multiplexer MUX having n+3 inputs E0', E0, E1 ... E(n+1) selectes five immediately adjacent bits from the second register RE2, for example $y_1 \ldots y_5$, and through-connects those selected bits to its outputs A0 through A4. An operation instruction OB is derived from those bits in a logic circuit LSG having inputs connected to the multiplexer outputs. The operation instruction OB is provided at a first output 1 of the logic unit LSG and is supplied to an operation instruction input 2 of the arithmetic unit RW. The operation instruction OB enables the arithmetic unit to either subtract the binary number pending at the operand input A from the binary number pending at the operand input B, or to add the number pending at input A to the number pending at input B, or to through-connect the binary number pending at the input B to the output of the arithmetic unit RW.

Additionally, a shift instruction SB is derived in the logic unit LSG from the bits pending at the output of the multiplexer MUX, the shift instruction SB being provided at an output 3 of the logic unit LSG, and being supplied to a control input of the multiple shift unit MS. The shift instruction SB effects a so-called arithmetic shift of the binary number contained in the n-place multiple shift unit MS by a specific number of places, i.e., by one or more places toward the right, as indicated by the arrow 4. The bits of the binary number contained in the multiple shift unit MS are referenced $s_{n-1}, s_{n-2} \ldots s_0$, with $s_{n-1}$ identifying the operational sign of this number as the highest order bit. As shifting occurs, the less significant bits $s_0, s_1, s_2$ etcetera are dropped, and the places at the left of the multiple shift unit MS which have now become open are respectively occupied with the operational sign bit $s_{n-1}$. After a three place shift, for example, the binary number $s_{n-1}, s_{n-1}, s_{n-1}, s_{n-1}, s_{n-2} \ldots s_3$ is contained in the multiple shift unit MS.

Multiplication of two numbers X and Y proceeds as follows. Respective "0" bits are first entered into all places of the accumulator AC and of the multiple shift unit MS. In the multiplexer MUX, the bits pending at the inputs E0', E0 ... E3 are through connected to the outputs A0 ... A4, with a "0" continuously pending at the input E0'. Instructions OB and SB are derived therefrom in the logic unit LSG, with the signal OB initiating one of the three above-described operations of the arithmetic unit RW. The arithmetic unit RW performs the designated operation utilizing the number X pending at the operand input A and the "0" bits supplied to the operand input B from the accumulator AC. The first logic operation results in a number $s_{n-1} \ldots s_0$, this being supplied to the multiple shift unit MS. The shift instruction SB derived in the logic unit LSG causes the multiple shift unit MS to arithmetically shift this first logic operation result toward the right by a specific number of places in the manner already described. The number now contained in the shift unit MS is then supplied to the accumulator AC as a first intermediate sum.

The bits $y_1 \ldots y_5$ pending at the inputs dislocated two places toward the left, i.e., pending at E1 ... E5, are subsequently through-connected by the multiplexer MUX to the outputs A0 through A4. Two new instructions OB and SB are now derived in the logic unit LSG, with the instruction OB causing the arithmetic unit RW to logically combine the number X pending at the operand input A with the first intermediate sum pending at the operand input B (supplied from the accumulator AC) according to one of the three possible operations, such that a second logical operation result arises. In accordance with the shift instruction SB, this result is arithmetically shifted toward the right by a specific number of places in the multiple shift unit MS, whereby a second intermediate sum is present in the unit MS, this new intermediate sum being supplied to the accumulator AC.

Further identical iterations follow, with the multiplexer MUS through-connecting the bits of the multiplier Y shifted by two places toward the left to its outputs with each iteration.

Upon the occurrence of a last step, the bits at the last five inputs E(n−3), E(n−2), E(n−1), En and E(n+1) are through-connected by the multiplexer MUX, with the last three inputs being occupied with the same bit. The bits $y_{n-3} \ldots y_{n-1}, y_{n-1}, y_{n-1}$ can therefore be taken at the outputs A0 ... A4. The instructions OB and SB derived therefrom initiate in the arithmetic unit RW a logic operation on X with the intermediate sum stored in the accumulator AC and an arithmetic shift of the logic operation result in the multiple shift unit MS in accordance with the instruction SB. The binary number which has thereby arisen in the multiple shift unit MS represents the product of the binary numbers X and Y consisting of the n highest-order or most significant bits. When n is uneven, sampling is no longer undertaken for the last step E(n+1), so that the bits $y_{n-4} \ldots y_{n-1}, y_{n-1}$ are through-connected.

Formation of the instructions OB and SB from the bits of the number Y which are obtained at the multiplexer outputs A0 ... A4 ensues according to the following table, wherein the first five columns are allocated to the outputs A0 ... A4 in the first row, and the sixth and seventh columns respectively contain the instructions OB and SB. The bits simultaneously appearing at the inputs and outputs of the logic circuit LSG are shown in one row.

| A4 | A3 | A2 | A1 | A0 | OB | SB |
|----|----|----|----|----|-----|----|
| 0 | 0 | 0 | 0 | 0 | 0 | 2 |
| 0 | 0 | 0 | 0 | 1 | 1 | 1 |
| 0 | 0 | 0 | 1 | 1 | 1 | 1 |
| 0 | 0 | 0 | 1 | 1 | 1 | 0 |
| 0 | 0 | 1 | 0 | 0 | −1 | 1 |
| 0 | 0 | 1 | 0 | 1 | −1 | 2 |
| 0 | 0 | 1 | 1 | 0 | −1 | 2 |
| 0 | 0 | 1 | 1 | 1 | 0 | 3 |
| 0 | 1 | 0 | 0 | 0 | 0 | 3 |
| 0 | 1 | 0 | 0 | 1 | 1 | 2 |
| 0 | 1 | 0 | 1 | 0 | 1 | 2 |
| 0 | 1 | 0 | 1 | 1 | 1 | 1 |
| 0 | 1 | 1 | 0 | 0 | −1 | 2 |
| 0 | 1 | 1 | 0 | 1 | −1 | 3 |
| 0 | 1 | 1 | 1 | 0 | −1 | 3 |
| 0 | 1 | 1 | 1 | 1 | 0 | 4 |
| 1 | 0 | 0 | 0 | 0 | 0 | 4 |
| 1 | 0 | 0 | 0 | 1 | 1 | 3 |
| 1 | 0 | 0 | 1 | 0 | 1 | 3 |
| 1 | 0 | 0 | 1 | 1 | 1 | 2 |
| 1 | 0 | 1 | 0 | 0 | −1 | 1 |
| 1 | 0 | 1 | 0 | 1 | −1 | 2 |
| 1 | 0 | 1 | 1 | 0 | −1 | 2 |
| 1 | 0 | 1 | 1 | 1 | 0 | 3 |
| 1 | 1 | 0 | 0 | 0 | 0 | 3 |
| 1 | 1 | 0 | 1 | 0 | 1 | 2 |
| 1 | 1 | 0 | 1 | 1 | 1 | 1 |
| 1 | 1 | 1 | 0 | 0 | −1 | 0 |
| 1 | 1 | 1 | 0 | 1 | −1 | 1 |
| 1 | 1 | 1 | 1 | 0 | −1 | 1 |
| 1 | 1 | 1 | 1 | 1 | 0 | 2 |

An instruction OB=1 indicates that the operands at the arithmetic units inputs A and B are added. An instruction OB=−1 indicates that the operand at input A is substrated from the operand B, whereas OB=0 indicates that the operand at input B should be directly through-connected to the output of the arithmetic unit RW. The numerical values in the column for the instructon SB indicate the number of places by which the logic operation result supplied as an output by the arithmetic unit RW to the multiple shift unit MS should be shifted toward the right in the unit MS.

The multiple shift unit MS may, for example, be a unit of the type known as a "barrel shifter" disclosed in the book "Introduction to the MLSI Systems" by C. Mead and L. Conway, October 1980, at pages 157–161. The logic circuit LSG may, for example, be a read only memory or a logic gate circuit.

Although modifications and changes may be suggested by those skilled in the art it the intention of the inventor to embody within the patent warranted hereon all changes and modifications as reasonably and properly come within the scope to his contribution to the art.

I claim as my invention:

1. A multiplication unit for multiplying two n-place binary numbers comprising:
   a first register containing the multiplicand;
   an accumulator for storing intermediate results;
   an arithmetic unit having inputs respectively connected to the outputs of said first register and said accumulator for undertaking interative combinations of the contents of said first register and said accumulator, said arithmetic unit further having an instruction input;
   a multiple shift means having an input connected to the output of said arithmetic unit for receiving the result of each combination in said arithmetic unit therefrom, and an output connected to the input of said accumulator, and further having a control input;
   a second register containing the multiplier;
   a multiplexer having a plurality of inputs respectively connected to the outputs of said second register for receiving the n bits of said multiplier from said second register, and having a selected plurality of outputs, said multiplexer further having a first multiplexer input connected so as to always exhibit a logic "0" and two additional multiplexer inputs connected for always exhibiting the highest order bit for said multiplier, said multiplexer through-connecting a selected plurality of adjacent bits of said multiplier to said selected plurality of outputs; and
   a logic circuit having a plurality of inputs respectively connected to said selected plurality of outputs of said multiplexer, said logic circuit generating an instruction signal based on said selected bits of said multiplier which is supplied from said logic circuit to said instruction input of said arithmetic unit for instructing the combination to be undertaken on the inputs of said arithmetic unit, said logic circuit further generating a control signal based on said selected bits of said multiplier which is supplied to said control input of said multiple shift means for controlling transfer of the contents of said multiple shift means to said accumulator.

2. A multiplication unit as claimed in claim 1 wherein said logic circuit is a read only memory.

3. A method for multiplying two n-place binary numbers in a unit having a first register containing the multiplicand, a second register containing the multiplier, an accumulator for storing an intermediate result, an arithmetic unit for undertaking iterative combinations of the contents of said first register and said accumulator, a shift means for transferring the result of each combination in said arithmetic unit to said accumulator, a logic means for defining the combination to be undertaken in said arithmetic unit on said first register and accumulator contents and for controlling transfer of said result from said shift means to said accumulator, and a multiplexer connected between the outputs of said second register and the inputs of said logic means, said method comprising the steps of:

(a) loading said accumulator and said shift means with "0" bits in all places;
(b) through connecting the five least significant adjacent bits of said multiplier from said second register through said multiplexer to said logic means;
(c) deriving an instruction signal for said arithmetic unit and a control signal for said shifter in said logic means from said adjacent bits;
(d) logically combining the contents of said first register and said accumulator in said arithmetic unit in accordance with said instruction signal;
(e) supplying the result of said combination to said shifter;
(f) shifting the contents of said shifter by a selected number of places in accordance with said control signal;
(g) transferring the contents of said shifter to said accumulator; and
(h) repeating steps (b) through (g) with said five at least significant adjacent bits being shifted a same selected number of places toward the most significant bit of said multiplier with each repetition until a highest order input of said multiplexer is reached.

4. A multiplication unit for multiplying two n-place binary numbers comprising:

a first register containing the multiplicand;
an accumulator for storing intermediate results;
an arithmetic unit having inputs respectively connected to the outputs of said first register and said accumulator for undertaking interative combinations of the contents of said first register and said accumulator, said arithmetic unit further having an instruction input;
a multiple shift means having an input connected to the output of said arithmetic unit for receiving the result of each combination in said arithmetic unit therefrom, and an output connected to the input of said accumulator, and further having a control input;
said multiple shift means undertaking an arithmetic shift of the result of each summation received from said arithmetic unit before transferring said result to said accumulator, said arithmetic shift shifting said result a selected number of places in dependence upon a signal received at said control input;
a second register containing the multiplier;
a multiplexer having a plurality of inputs respectively connected to the outputs of said second register and having a selected plurality of outputs, said multiplexer through-connecting a selected plurality of adjacent bits of said multiplier to said selected plurality of outputs; and
a logic circuit having a plurality of inputs respectively connected to said selected plurality of outputs of said multiplexer, said logic circuit generating an instruction signal based on said selected bits of said multiplier which is supplied from said logic circuit to said instruction in put of said arithmetic unit for instructing the combinatio to be undertaken on the inputs of said arithmetic unit, said logic circuit further generating a control signal based on said selected bits of said multiplier which is supplied to said control input of said multiple shift means for controlling transfer of the contents of said multiple shift means to said accumulator.

5. A multiplication unit for multiplying two n-place binary numbers comprising:

an n-place first register containing the multiplicand;
an n-place accumulator for storing intermediate results;
an n-place arithmetic unit having inputs respectively connected to the outputs of said first register and said accumulator for undertaking interative combinations of the contents of said first register and said accumulator, said arithmetic unit further having an instruction input;
an n-place multiple shift means having an input connected to the output of said arithmetic unit for receiving the result of each combination in said arithmetic unit therefrom, and an output connected to the input of said accumulator, and further having a control input;
a n-place second register containing the multiplier;
a multiplexer having a plurality of inputs respectively connected to the outputs of said second register for receiving the n bits of said multiplier from said second register, and having a selected plurality of outputs, said multiplexer further having a first multiplexer input connected so as to always exhibit a logic "0" and two additional multiplexer inputs connected for always exhibiting the highest order bit for said multiplier, said multiplexer through-connecting a selected plurality of adjacent bits of said multiplier to said selected plurality of outputs; and
a logic circuit having a plurality of inputs respectively connected to said selected plurality of outputs of said multiplexer, said logic circuit generating an instruction signal based on said selected bits of said multiplier which is supplied from said logic circuit to said instruction input of said arithmetic unit for instructing the combination to be undertaken on the inputs of said arithmetic unit, said logic circuit further generating a control signal based on said selected bits of said multiplier which is supplied to said control input of said multiple shift means for controlling transfer of the contents of said multiple shift means to said accumulator.

6. A method for multiplying two n-place binary numbers in a unit having a first register containing the multiplicand, a second register containing the multiplier, an accumulator for storing an intermediate result, an arithmetic unit for undertaking iterative combinations of the contents of said first register and said accumulator, a shift means for transferring the result of each combination in said arithmetic unit to said accumulator, a logic means for defining the combination to be undertaken in said arithmetic unit on said first register and accumulator contents and for controlling transfer of said result from said shift means to said accumulator, and a multiplexer connected between the outputs of said second register and the inputs of said logic means, said method comprising the steps of:

(a) loading said accumulator and said shift means with "0" bits in all places;

(b) through connecting a selected plurality of least significant adjacent bits of said multiplier from said second register through said multiplexer to said logic means;

(c) deriving an instruction signal for said arithmetic unit and a control signal for said shifter in said logic means from said adjacent bits;

(d) logically combining the contents of said first register and said accumulator in said arithmetic unit in accordance with said instruction signal;

(e) supplying the result of said combination to said shifter;

(f) shifting the contents of said shifter by a selected number of places in accordance with said control signal;

(g) transferring the contents of said shifter to said accumulator; and (h) repeating steps (b) through (g) with said selected plurality of adjacent bits being shifted two places toward the most significant bit of said multiplier with each repetition unit 1 a highest order input of said multiplexer is reached.

7. A method for multiplying two n-place binary numbers as claimed in claim 6 wherein said multiplexer has n multiplexer inputs to which the n bits of said mutliplier are supplied from said second register, a first multiplexer input connected for continuously exhibiting a logic "0", and two additional multiplexer inputs connected for always exhibiting the highest order bit of said multiplier, and wherein step (h) is further defined by repeating steps (b) through (g) with said selected plurality of adjacent bits being shifted two places toward the most significant bit of said multiplier with each repetition until both said two additional multiplexer inputs are through-connected along with other adjacent multiplexer inputs.

* * * * *